US008582724B2

(12) United States Patent
Olshansky et al.

(10) Patent No.: US 8,582,724 B2
(45) Date of Patent: *Nov. 12, 2013

(54) E911 LOCATION SERVER

(75) Inventors: Robert Olshansky, Wayland, MA (US); Elliot G. Eichen, Arlington, MA (US); Derek Mitsumori, Lexington, MA (US); Eric R. Sporel, Westford, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/575,397

(22) Filed: Oct. 7, 2009

(65) Prior Publication Data

US 2010/0020942 A1    Jan. 28, 2010

Related U.S. Application Data

(63) Continuation of application No. 11/274,301, filed on Nov. 16, 2005, now Pat. No. 7,711,094.

(51) Int. Cl.
*H04M 11/04* (2006.01)

(52) U.S. Cl.
USPC ............ 379/45; 379/106.01; 379/201.06; 379/201.1; 370/351; 370/353; 370/354; 370/355; 370/356; 455/456.5; 709/224

(58) Field of Classification Search
USPC ............ 370/352, 351, 353, 354, 355, 356; 379/45, 106.01, 201.06, 201.1; 455/456.5; 709/224
See application file for complete search history.

(56) References Cited

U.S. PATENT DOCUMENTS

| | | |
|---|---|---|
| 6,501,421 B1 | 12/2002 | Dutta et al. |
| 6,687,245 B2 | 2/2004 | Fangman et al. |
| 6,819,929 B2 | 11/2004 | Antonucci et al. |
| 7,127,044 B1 | 10/2006 | Becker et al. |
| 7,130,385 B1 | 10/2006 | Moon |
| 7,227,941 B2 | 6/2007 | Baumeister et al. |
| 7,440,442 B2 | 10/2008 | Grabelsky et al. |
| 7,706,356 B1 | 4/2010 | Olshansky et al. |
| 7,711,094 B1 | 5/2010 | Olshansky et al. |
| 2003/0063714 A1 | 4/2003 | Stumer et al. |
| 2003/0109245 A1* | 6/2003 | McCalmont et al. ......... 455/404 |
| 2003/0169751 A1 | 9/2003 | Pulkka et al. |
| 2003/0225893 A1 | 12/2003 | Roese et al. |
| 2004/0190497 A1* | 9/2004 | Knox ............................ 370/352 |
| 2005/0007999 A1 | 1/2005 | Becker et al. |
| 2005/0083911 A1* | 4/2005 | Grabelsky et al. ............ 370/352 |
| 2005/0213716 A1 | 9/2005 | Zhu et al. |
| 2005/0270560 A1 | 12/2005 | Ferlitsch |

(Continued)

OTHER PUBLICATIONS

Cisco Systems, "Cisco Emergency Responder Version 1 2(2)", Cisco Emergency Responder Version 1 2(2), Cisco Systems, Inc. (1992-2004), pp. 1-7, Jan. 1, 2004.
Nortel Networks, "Location Services for IP", Location Services for IP, Nortel (May 9, 2005), pp. 1-40, May 9, 2005.

*Primary Examiner* — Quynh H Nguyen

(57) ABSTRACT

A system including a location server configured to receive registration data from an IP device and a location database configured to store location information of the IP device, wherein the location server queries the location database to determine whether the registration data matches the location information stored at the location database.

35 Claims, 11 Drawing Sheets

(56) References Cited

U.S. PATENT DOCUMENTS

| | | |
|---|---|---|
| 2006/0043164 A1 | 3/2006 | Dowling et al. |
| 2006/0056388 A1 | 3/2006 | Livingood |
| 2006/0193447 A1 | 8/2006 | Schwartz |
| 2006/0274725 A1 | 12/2006 | Freitag et al. |
| 2007/0104183 A1 | 5/2007 | Bakke et al. |
| 2008/0133762 A1 | 6/2008 | Edge et al. |

* cited by examiner

E911 LOCATION SERVER

BENEFIT OF PRIORITY

This application is a continuation of U.S. application Ser. No. 11/274,301, "E911 Location Server," filed Nov. 16, 2005, which is expressly incorporated herein by reference in its entirety.

CROSS REFERENCE TO RELATED PATENTS

The present invention relates to the following co-pending commonly owned U.S. patent application: "Mapping of IP Phones for E911 ," filed Dec. 28, 2005, Ser. No. 11/318,836.

BACKGROUND INFORMATION

For a Public Switched Telephone Network (PSTN) service, telephone numbers are tied to a physical infrastructure and known physical addresses. If a user places a 911 call from a telephone having one of these stationary telephone numbers, the physical address for the telephone can be determined by querying an Automatic Location Identification (ALI) database.

For Internet Protocol (IP) phones, the above scenario is not possible because the IP phones can be easily moved from one physical location to another. These IP phones can re-register for service wherever the IP phone can establish an IP connection. In addition, IP phones can be located as "soft-phones"—software-implemented phones—on IP-capable mobile devices, such as laptops and handheld devices.

Another problem is an IP phone can be assigned a traditional telephone number (e.g., NPA-XXX-XXXX) that is normally associated with a totally different number plan area (area code) and prefix from its actual physical location. The IP phone having a corresponding telephone number may not have a relationship to its corresponding number plan area and prefix for its home location even for an IP phone physically at its home location.

Yet another problem is that several different IP phones, each of which are located at different physical locations, can be registered to the same traditional telephone number. This would be a generalization of the concept of phone extensions, except that for Voice over Internet Protocol (VoIP, also known as Internet Telephony), the extensions can be geographically dispersed and nomadic. Therefore, it is difficult to determine the location of each of the IP phones.

DESCRIPTION OF THE PREFERRED EMBODIMENTS

Reference will now be made in detail to the exemplary preferred embodiments implemented according to the invention, the examples of which are illustrated in the accompanying drawings. Wherever possible, the same reference numbers will be used throughout the drawings to refer to the same or like parts.

Figure 1:
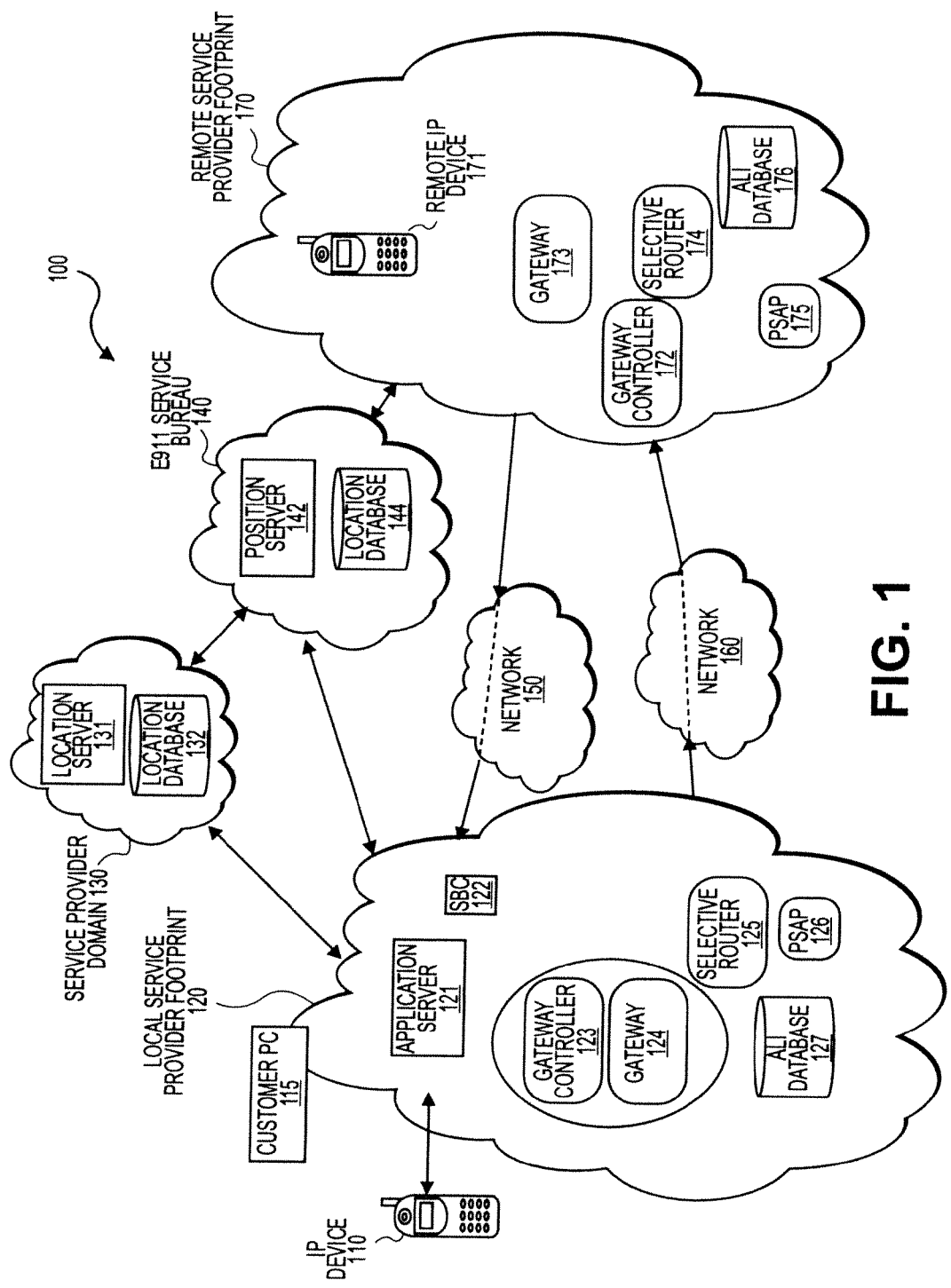
FIG. 1 is a block diagram of an exemplary emergency call network.

FIG. 1 is a block diagram of an exemplary emergency call network. The exemplary emergency call network 100 can be any type of system that transmits information over a network. For example, emergency call network 100 can be a VoIP system that communicates using data packets that are transmitted over the Internet or some other Internet Protocol (IP) capable network. Emergency call network 100 includes an IP device 110, a personal computer (PC) 115, local service provider footprint 120, a service provider domain 130, a Service Bureau 140, various networks 150 and 160, and a remote service provider footprint 170.

IP device 110 is a device that allows a user to speak to other remote users. For example, IP device 110 can be an IP phone or any device that allows users to make a telephone call using IP transmissions. In some embodiments, IP device 110 may also be a telephone based on a wireless system, for example, an IP cellular telephone, a cellular telephone, or a telephone based on a satellite system. IP device 110 may be a conventional smart phone, such as a PC phone, a Session Initiation Protocol (SIP) phone, and a phone based on the call control standard commonly referred to as H323, which can process signals based on voice and/or Dual Tone Modulation Frequency (DTMF) tones. In some embodiments, IP device 110 may also include a Wireless Access Protocol (WAP) client, such as a cellular telephone, a Personal Digital Assistant (PDA), and a HyperText Transfer Protocol (HTTP) client, such as an Internet browser, which can process signals based on text. As used herein, IP device includes, but is not limited to, all of the above and is not intended to be restrictive in any way.

As shown in FIG. 1, IP device 110 may be connected to the local service provider footprint 120 via a conventional telephone line, a cable television line, a Digital Subscriber Line (DSL), an Integrated Services Digital Network (ISDN) line, a wireless transmission, and/or another communications line. The IP device 110 may also be connected to the service provider footprint 120 through an intermediary. For example, the IP device 110 may be connected to the service provider footprint 120 via a base station and a switch, such as a base station and a switch for a cellular telephone.

PC 115 can include a processor (CPU) and a memory system including various memories such as RAM, disc drives, etc. Each of the PCs 115 may also include a display or monitor, a keyboard, and possibly one or more additional user input devices (not shown) such as a mouse, joystick, or track ball. Typically, the software running on the PC 115 includes an operating system, such as Windows, and a series of compatible application programs running under the operating system. The software preferably implements a graphical user interface, including a user interface for communications to the local service provider footprint 120.

PC 115 can have voice communication capabilities. For example, PC 115 can include a microphone and one or more speakers. PC 115 can also include analog to digital and digital to analog converters, and the CPUs in such PC 115 may run software for compression and decompression of digitized audio (typically voice) information. The software also processes the audio information for transmission and reception of the compressed digital information in IP packets and using the appropriate protocol, for communication with the respective access server.

Local service provider footprint 120 is a communication system. For example, the local service provider footprint 120 can be a wireline or cellular network using IP transport. Local service provider footprint 120 can communicate with a service provider domain 130, a E911 Service Bureau 140, and a remote service provider footprint 170 via network 160. Local service provider footprint 120 may include, among other things, an application server 121, a session border controller (SBC) 122, a gateway controller 123, a gateway 124, a selective router 125, a Public Safety Answering Point (PSAP) 126, and an Automatic Location Information (ALI) database 127.

Application server 121 is a server that includes software and/or hardware that allows it to receive communications or communicate with various other components located in the emergency call network 100. The application server 121 can register the IP device 110 and receive IP call signals from the SBC 122. The application server 121 can communicate with a position server 142 located at the E911 Service Bureau 140. In addition, the application server 121 can transmit routing information to the local gateway controller 123 or a remote gateway controller 172 (further discussed below).

SBC 122 is a VoIP session-aware device that controls call admission to the emergency call network 100 at the border of that local service provider footprint 120, and optionally (depending on the device) performs a host of call-control functions to ease the load on the call agents within the network. In some instances, SBC 122 acts as a firewall so that a customer or another server provider cannot determine how a call is routed. In some embodiments, the SBC can hide external and internal IP addresses. In addition, the SBC can filter register messages and forward copies of the register messages to a location server.

Gateway controller 123 is configured to determine the location of IP device and its media capabilities so that a level of service can be chosen that may be possible for all users and operators. In some embodiments, gateway controller 123 can be a CS2K Media Gateway controller provided by Nortel Networks. Gateway controller 123 receives routing and query data from the application server 121. Based on the routing data, the gateway controller 123 transmits query data to local gateway 124 or a remote gateway 173 (further discussed below). This communication between the gateway controller 123 and the local or remote gateway 124 or 173 can be conducted using a Media Gateway Control Protocol (MGCP) that handles signaling and session management for a multimedia conference.

Gateway 124 is a device that converts formatted data provided in one type of network to a particular format required for another type of network. Gateway 124, for example, may be a server, a router, a firewall server, a host, or a proxy server.

The gateway 124 transforms telephone signaling information and voice data between packet-based (e.g., IP) and telephony protocols and sends the telephone signaling information, and later the voice data, to the selective router 125 over a voice trunk or a VoIP trunk. Gateway 124 may be capable of processing audio, video, and T.120 transmissions alone or in any combination, and is capable of full duplex media translations. Also, gateway 124 has the ability to receive query data signals from the gateway controller 123 to allow the local gateway 124 or the remote gateway 173 to connect to a selective router within the same footprint.

Selective router 125 is a router that provides the routing of a E911 call to the proper PSAP 126 based upon the ESRN. The ESRN is a ten-digit number used for routing to the correct PSAP. The ESRN is determined by the location of the caller as recorded in an ALI database. The ESQK (emergency service query key) is a ten-digit number assigned by the Service Bureau that receives the 911 call. The ESQK enables the PSAP to correlate the call with an entry in the E911 ALI database that contains the location information and the caller's call back number.

In some embodiments, selective router 125 communicates with a selective router database, which provides the selective router 125 with information for tandem switching of the emergency call and to ensure the routing of the emergency call to the proper PSAP 126 along with an automatic number identification (ANI).

PSAP 126 is an agency responsible for answering emergency calls for emergency assistance from police, fire, and ambulance services. For example, there are roughly 6,500 PSAPs across the United States, where the PSAPs are typically county or city controlled. The PSAP 126 includes an operator console so an operator can determine the location of the emergency caller. PSAP 126 is communicatively coupled to selective router 125 and the ALI database 127.

ALI database 127 is a database correlating ANI and ALI data with a physical location for each telephone connected to a local or remote network. The PSAP 126 uses the ALI database 127 to automatically display the physical location and telephone number of the IP device 110 being used to make the emergency call. Such information allows the PSAP 126 operator to direct the requested services to the proper location, and allows the PSAP 126 operator to call back in the event the connection is lost, or if more information is needed. If the ALI database 127 does not have the necessary information, the ALI database 127 can communicate with the Service Bureau 140 to get the necessary location and number data.

The service provider domain 130 is a group of computers and devices on a network that are administered as a unit with common rules and procedures and share a common name. The service provider domain 130 includes, among other things, a location server 131 and a location database 132. Location server 131 can receive location information from a PC application or from a web server, wherein the user manually inputs the location information into the PC application or the Web GUI. Location server 131 also provides location information updates to the E911 Service Bureau 140. Location server can also validate addresses against a master address guide such as MSAG. Location database 132 stores information relating to the location of a user.

The E911 Service Bureau 140 provides location and IP device 110 telephone number information to the ALI database 127. The E911 Service Bureau 140 is provisioned with the caller's service address, which may be used as the default static, or home, location as well as routing information to the selective router 125 and PSAP 126. In addition, the E911 Service Bureau 140 provides ESQK information to the local service provider footprint 120 to track the position of a user at an IP device 110. E911 Service Bureau 140, can be, for example, the Intrado Service Bureau. The E911 Service Bureau 140 can include a Service Bureau position server 142 and a Service Bureau location database 144.

Service bureau position server 142 determines location information based on the IP device's 110 telephone number. Service bureau position server 142, for example, can be an Intrado Position Server. Service bureau position server 142 utilizes the IP device 110 (or 171, as discussed below) to determine the correct PSAP 126 (or 175) closest to the emergency site and returns the ESRN and the ESQK to the local service provider footprint 120.

Service bureau location database 144 is a database that stores location and number information of the static or nomadic IP devices 110 or 171. The Service bureau location database 144 can be, for example, an Intrado Location database. The Service Bureau location database 144 can be communicatively coupled to an ALI database at any service provider footprint.

Networks 150 and 160 allow remote footprints to communicate with each other. Networks 150 and 160 can be Internet Protocol Virtual Private Networks (IP-VPN), the Internet, or any other suitable network. In some embodiments, the networks 150 and 160 are private networks constructed across a public network or Internet. If the data is sent through a public network, the data sent across could be encrypted so the entire network is private. Consequently, in some embodiments, footprints may include encryption and decryption facilities so that the data transmitted across networks 150 and 160 remains private outside the footprint and public within the footprint.

Remote service provider footprint 170 is a communication system that can be similar to or different than the local service provider footprint 120. For example, the remote service provider footprint 170 can be a wireline or wireless IP network or any other type of communication system. Remote service provider footprint 170 can include, among other things, an application server (not shown), an SBC (not shown), a gateway controller 172, a gateway 173, a selective router 174, PSAP 175, and an ALI database 176, each of which have similar capabilities as those described above for the local service provider footprint 120.

Figure 2:
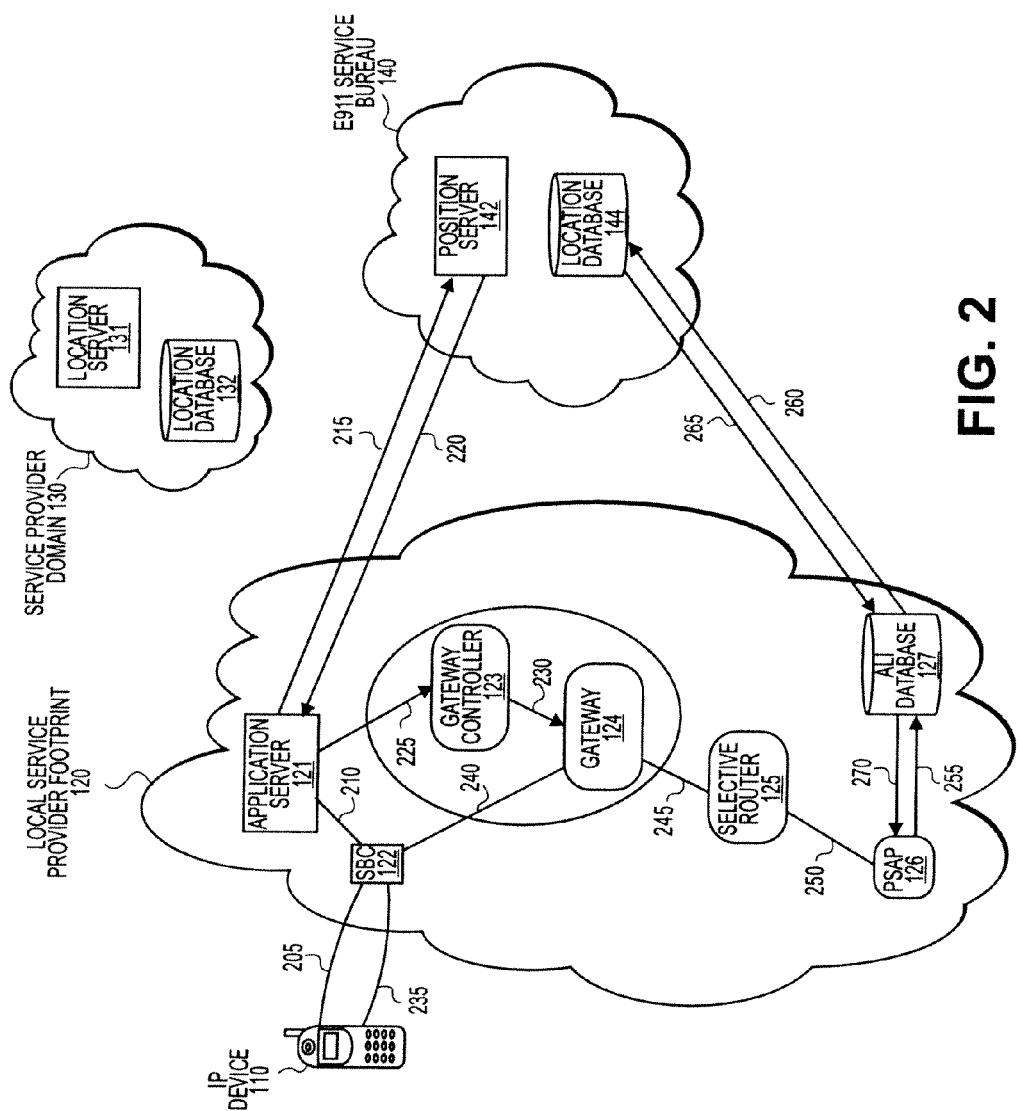
FIG. 2 is a functional diagram showing call flow in the exemplary system in FIG. 1 for providing emergency communication for a static emergency caller.

FIG. 2 is a functional diagram showing call flow in the exemplary system in FIG. 1 for providing emergency communication for a static VoIP emergency caller using direct trunking. First, the caller dials 911 from the IP device 110 and the IP device 110 transmits (205) the IP call signal to SBC 122. The IP call signal can include a telephone number or other identification of the IP device 110. Once the SBC 122 receives the IP call signal, the SBC 122 can perform call-control functions to the IP call signal. Then, the SBC 122 passes (210) the IP call signaling to the application server 121.

After receiving the IP call signaling from the SBC 122, the application server 121 queries (215) the position server 142 at the Service Bureau 140. For example, the querying can be done using an IP based GRIXE interface, communicating the telephone number, or other identification number, of the IP device 110 to the position server 142.

After the Service Bureau 140 has been queried, the position server 142 transmits (220) ESRN and ESQK parameters to the application server 121 at the local service provider footprint 120. The ESRN can facilitate routing to the appropriate selective router and the ESQK can facilitate routing to the appropriate PSAP.

After the application server 121 receives the ESRN and the ESQK, the application server 121 signals (225) to the gateway controller 123 to connect to gateway 124, which interconnects with a selective router 125. This allows the application server 121 to route the emergency call to the appropriate gateway controller 123 and gateway 124. The application server 121 can then remove the "911" and populate the called party number with a 10 digit number, which the gateway controller 123 can recognize as an emergency call destined to a specific selective router 125. In turn, the gateway controller 123 removes this 10 digit number, populates the called party number with "911". As a result, the gateway controller 123 connects (230) to the gateway 124 and provides the ESQK to the gateway 124 along with a dedicated (TDM) trunk.

After the gateway controller 123 connects to the gateway 124, the IP device 110 establishes (235) Real Time Protocol (RTP) communications with the SBC 122. As a result, the IP device 110 establishes (240) RTP communications with the gateway 124. Then, the gateway 124 converts the communication from IP to Time Division Multiplexing (TDM). The gateway 124 then passes (245) the direct trunking (TDM trunk) and the ESQK to the selective router 125.

The router 125 connects (250) the call (now TDM-based) to the PSAP 126, located at the local service provider footprint 120, using the E911 trunks that are based on the ESQK values. As a result, the PSAP 126 queries (255) the ALI database 127 to obtain the IP device's 110 ALI and Automatic Number Information (ANI) to be displayed at the operator console of the PSAP 126. If the ALI database 127 has the ALI and the ANI data, the ALI and ANI data is transmitted to the operator console.

However, if the ALI and ANI data are not stored in the ALI database 127, the ALI database 127 performs a steering operation (260), based on the ESQK, to the location database 144 at the Service Bureau 140 to obtain the ALI data and the ANI data. The location database 144 provides (265) the ANI and ALI data to the ALI database 127. As a result, the ALI database 127 forwards (270) the ALI and ANI data to the PSAP 126 where it is displayed at the operator's console. Once the operator has the ALI and ANI data, the operator can determine the location of the user so that, if needed, an emergency help team can assist the user.

Figure 3:
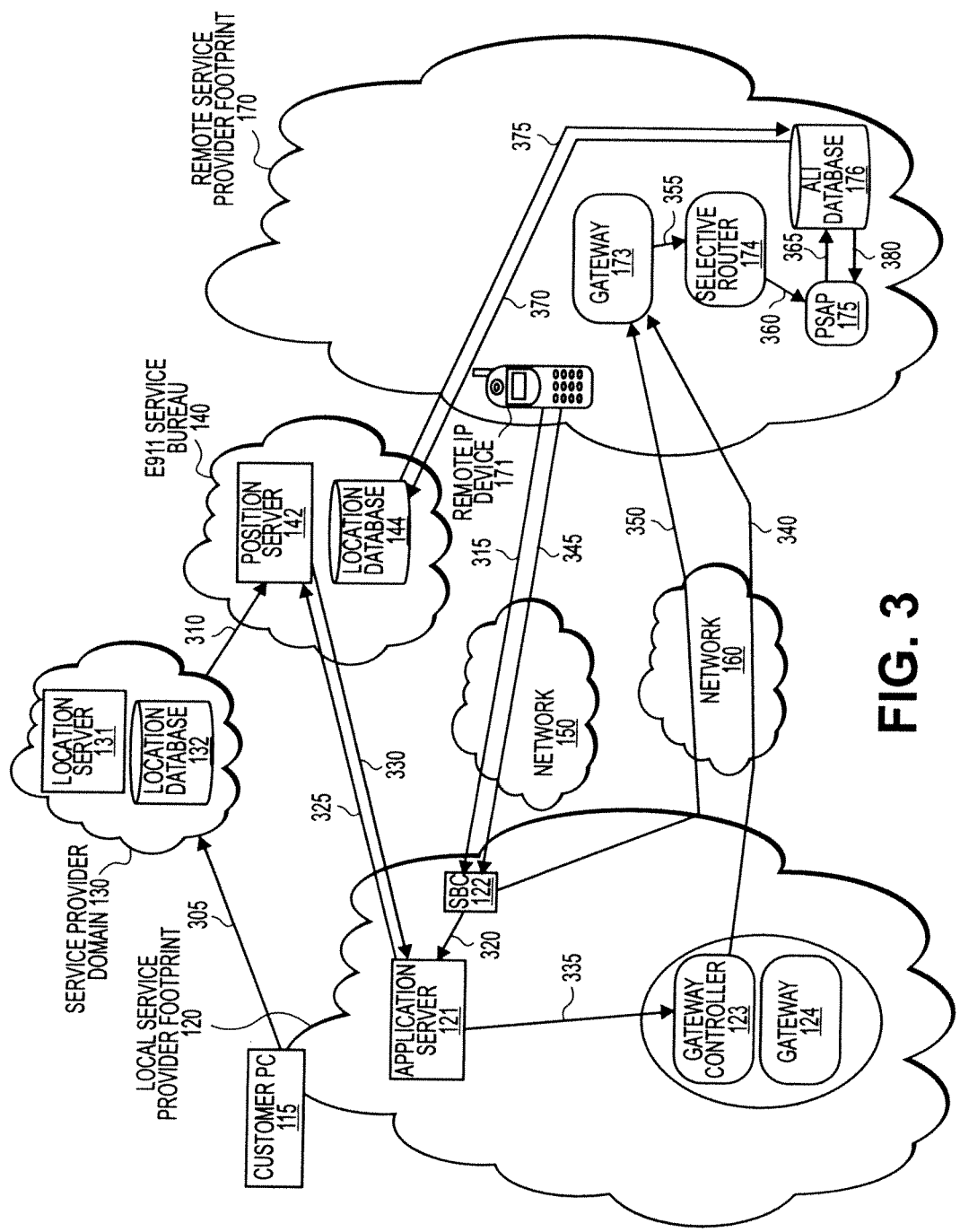
FIG. 3 is a functional diagram showing a first alternative call flow in the exemplary system in FIG. 1 for providing emergency communication for a nomadic emergency caller.

FIG. 3 is a functional diagram showing a first alternative call flow in the exemplary system in FIG. 1 for providing emergency communication for a nomadic emergency caller using direct trunking. First, prior to placing an emergency E911 call, the user manually updates the location of the remote IP device 171 at the PC 115. The PC transmits (305) this location information to the service provider domain 130. The location database 132 stores the location information of the nomadic remote device 171. In addition, the location server 131 at the service provider domain 130 forwards (310) the location information of the IP device to the position server 142 at the Service Bureau 140 to inform Service Bureau of the change of location of the remote IP device 171.

At some time after the Service Bureau 140 has received the remote IP device's location information, the caller dials 911 from the remote IP device 171 and the IP device 110 transmits (315) the IP call signal to the SBC 122 via network 150. Once the SBC 122 receives the IP call signal, the SBC 122 can perform call-control functions to the IP call signal. Then, the SBC 122 passes (320) the IP call signaling to the application server 121.

After receiving the IP call signaling from the SBC 122, the application server 121 queries (325) the position server 142 at the Service Bureau 140. The application server 121 communicates the telephone number or any other identification number of the IP device 171 to the position server 142.

After the Service Bureau 140 has been queried, the position server 142 accesses the location database 144 and, based on the telephone number of the remote IP device, transmits (330) ESRN and ESQK parameters to the application server 121 at the local service provider footprint 120. The ESRN can facilitate routing to the appropriate selective router, for this example selective router 174, and the ESQK can facilitate routing to the correct PSAP, for this example PSAP 175.

After the application server 121 receives the ESRN and ESQK data, the application server 121 signals (335) to the gateway controller 123 located at the local service provider footprint 120 to connect, via network 160, to gateway 173 located at the remote service provider footprint 170.

The application server 121 can then remove the "911" and populate the called party number with a 10 digit number, which the gateway controller 123 can recognize as an emergency call destined to the selective router 174. In turn, the gateway controller 123 removes this 10 digit number and populates the called party number with "911". As a result, the gateway controller 123 connects (340) and provides the ESQK to the gateway 173 located at the remote service provider footprint 170, for example, via network 160.

After the gateway controller 123 connects to the gateway 173, the remote IP device 171 establishes (345) Real Time Protocol (RTP) communications with the SBC 122 at the local service provider footprint 120 via network 150. As a result, the remote IP device 171 establishes (350) RTP communications with the gateway 173 through the SBC 122 via networks 150,160. Then, gateway 173 converts the communication from IP to Time Division Multiplexing (TDM). The gateway 173 then passes (355) the direct trunking (TDM trunk) and the ESQK to the selective router 174.

The router 174 connects (360) the call (now TDM-based) to the PSAP 175, located at the remote service provider footprint 170, using the E911 trunks that are based on the ESQK values. As a result, the PSAP 175 queries (365) the ALI database 176 to obtain the remote IP device's ALI and ANI data to be displayed at the operator console of the PSAP 175. If the ALI database 176 has the ALI and the ANI data, the ALI and ANI data is transmitted to the operator console at the PSAP 175.

However, if the ALI and ANI data are not stored in the ALI database 176, the ALI database 176 performs a steering operation (370), based on the ESQK, to the location database 144 at the Service Bureau 140 to obtain the ALI data and the ANI data. The location database 144 provides (375) the ANI and ALI data to the ALI database 176 at the remote service provider footprint 170. As a result, the ALI database 127 forwards (380) the ALI and ANI data to the PSAP 175 where it is displayed at the operator's console. The ALI and ANI data allow an operator to determine the location of the user of the remote IP device.

Figure 4:
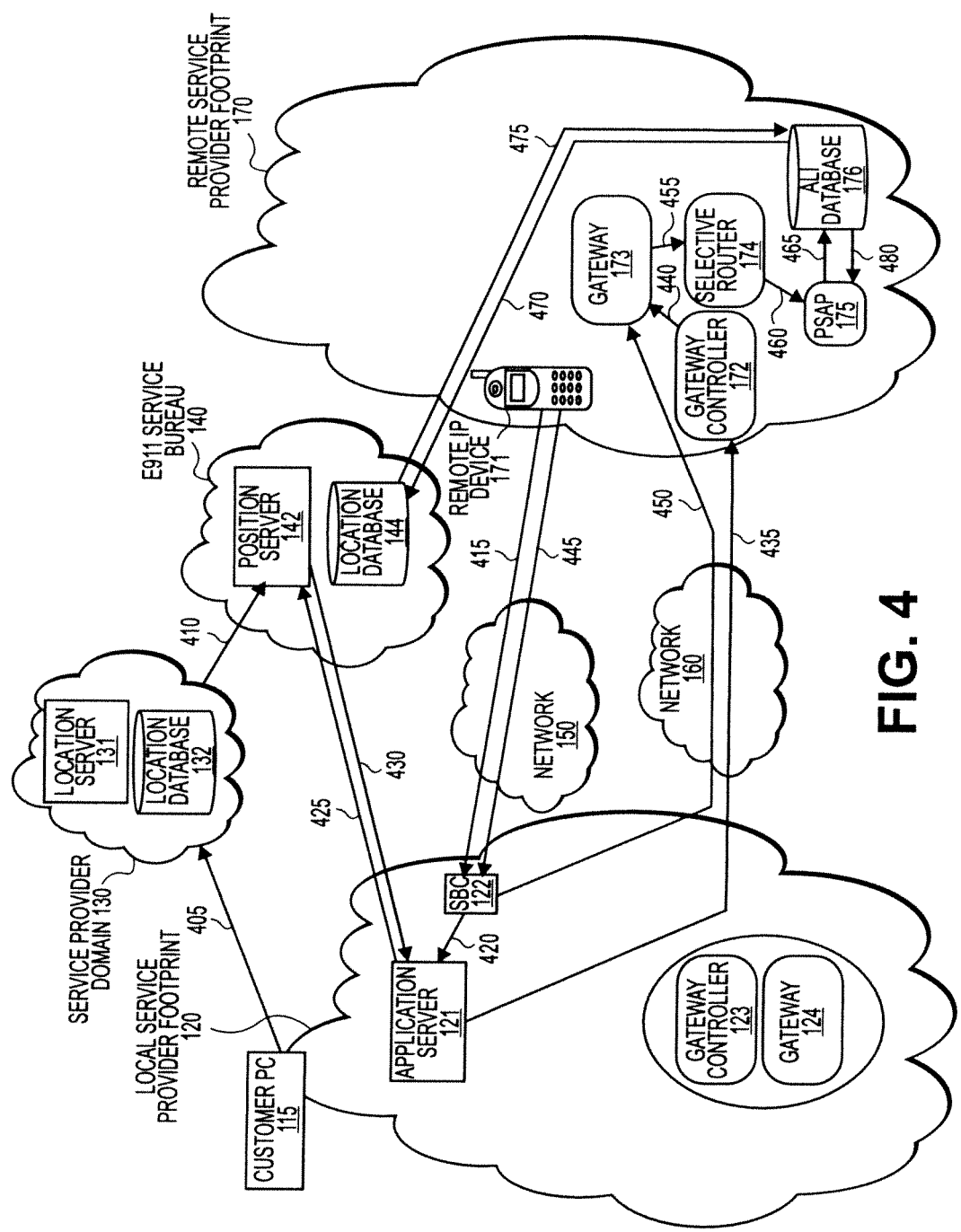
FIG. 4 is a functional diagram showing a second alternative call flow in the exemplary system in FIG. 1 for providing emergency communication for a nomadic emergency caller.

FIG. 4 illustrates an alternate embodiment to that of FIG. 3. The call processing illustrated in FIG. 4 is similar to that of FIG. 3, except that the application server 121 signals (435) to the gateway controller 172 located at the remote service provider footprint 170 (instead of the local gateway controller 123), which accordingly connects with (440) and provides the ESQK to the gateway 173.

Figure 5:
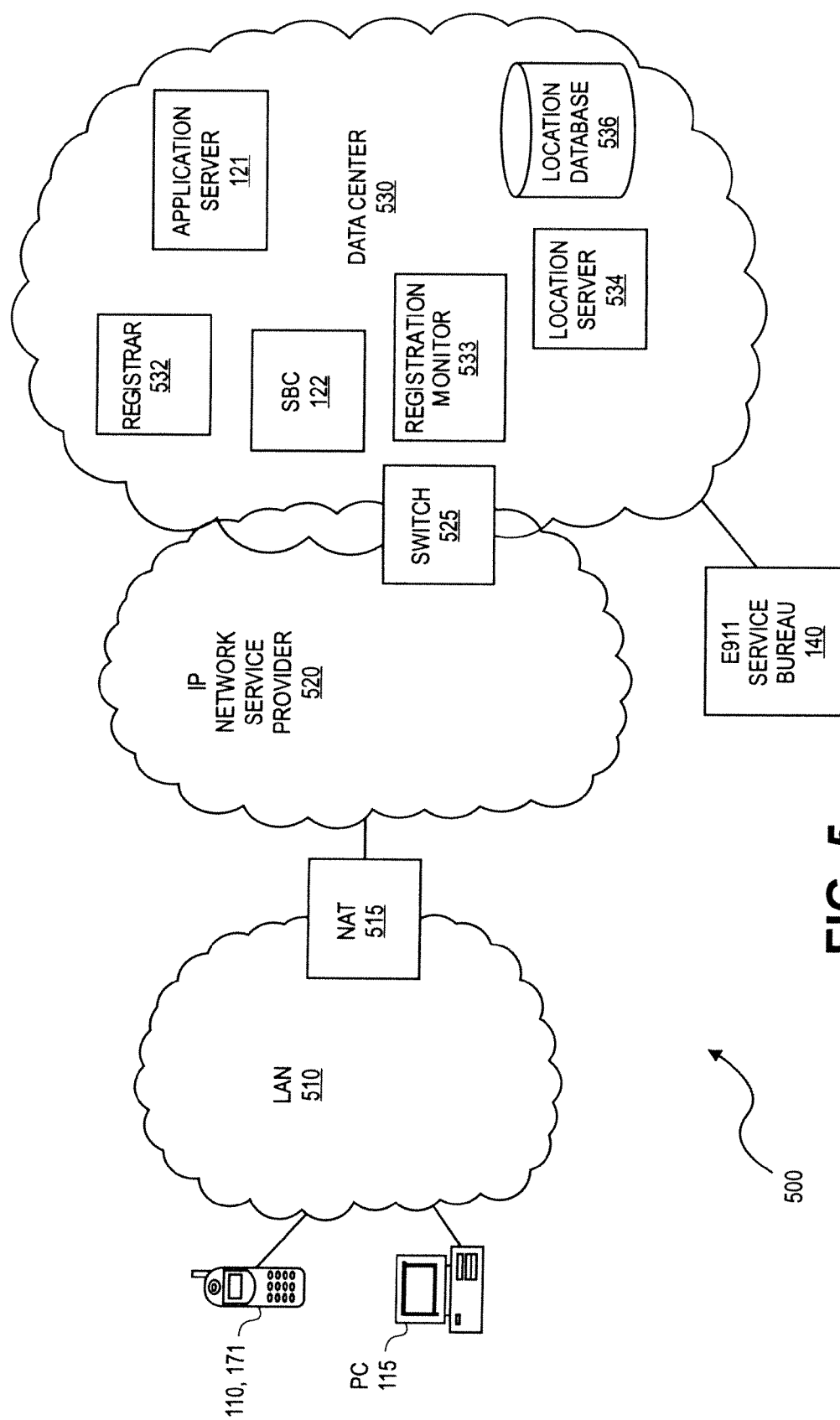
FIG. 5 is a block diagram of an exemplary system for providing registration and re-registration of an IP device.

FIG. 5 is a block diagram of an exemplary system for providing registration and re-registration of an IP device 110. The exemplary system includes an IP device 110, a PC 115, a local area network (LAN) 510, an IP Network Service Provider 520, a Data Center 530, and an E911 service center 140.

LAN 510 is a group of computers and associated devices that share a common communications line or wireless link and typically share the resources of a single processor or server within a small geographic area, such as an office building or small neighborhood. Usually, the server has applications and data storage that are shared in common by multiple computer users. A local area network may serve as few as two or three users (for example, in a home network) or as many as thousands of users (for example, in a FDDI network).

Network address translation (NAT) facility 515 may be present and is located on the fringe of the LAN 510 to prevent external users from learning their internal IP addresses. NAT 515 enables a LAN 510 to use one set of IP addresses for internal traffic and a second set of IP addresses for external traffic. This enables multiple hosts on a private network to access the Internet using a single public IP address. As communication traffic passes from the LAN to the IP network service provider 520, the source address on the data packets are translated from public IP addresses to private IP addresses. Typically, a company translates its private IP addresses to one or more public IP addresses and un-translates the public IP addresses on incoming packets back into private IP addresses. NAT 515 may be included as part of a router and can often be part of a corporate firewall.

IP Network Service Provider 520 provides users access by providing direct backbone access to the internal network and usually access to its network access points. The IP Network Service Provider 520 includes an IP switch or router 525. The Data Center 530 may also include an IP router or switch.

The switch 525 allows for multiple IP devices 110 or 171, such as a softphone on a PC 115 or a second hard phone at an office or home, using the same phone number to connect to the application server 121. For example, the exemplary methods shown in FIGS. 10-11 (further discussed below) allow each IP device 110 or 171 of the multiple IP devices having the same phone number to have its physical location stored at the location database 536. In telecommunications, a switch is a network device that includes facilities to select a path or circuit for sending a unit of data to its next destination. A switch may also include the function of the router, a device or program that can determine the route and specifically what adjacent network point the data should be sent to.

Data Center 530 includes several components that assist with the registration and the re-registration of the IP device 110 or 171. For example, Data Center 530 can be an Internet Telephone Service Provider Data Center. The Data Center 530 can include, among other things, an application server 121, an SBC 122, a registrar 532, a location server 534, and a location database 536. In some embodiments, the Data Center 530 can be a part of and within the IP Network Service Provider 520.

Registrar 532 is a server that receives registration requests from IP devices, such as IP device 110. The Registrar processes registration requests and may transmit data within the register requests to the location server 534. In addition, the registrar 532 may support authentication. In some embodiments, the registrar 532 and the SBC 122 are both located within the Data Center 530.

In some embodiments, there may be a registration monitor 533. The registration monitor 533 intercepts the register messages or copies of the register messages before they reach the SBC 122. The registration monitor 533 can either: (1) copy registration messages and forward the copy to the location server 534; or (2) perform some processing of the registration message and forward certain registration information to the location server 534. In some embodiments, the registration monitor can forward changes to a device's IP address information. The registration monitor 533 may attach to a port of a switch/router. This allows the registration messages to be intercepted prior to reaching the SBC 122 or the registrar 532, or alternatively, use a "Y-cable" to receive copies of all VoIP signaling messages being sent to the SBC 122 or the registrar 532. Functions of the registration monitor 533 may be built into other network or data center elements such as switches, routers, or SBCs.

Location server 534 is a server that obtains information about a user's possible location. For example, the location server 534 is used in conjunction with VoIP phone service. Location server 534 creates mappings of the IP device's identity to a location information, where the location information can be the internal and/or external IP addresses, or a physical address based on the internal and external IP subnets used at that physical address. Location server 534 uses the IP address information contained in VoIP registration message to determine if the device is at a known physical location whenever the device attempts to register or re-register. If the registration message reveals an external or internal IP address that does not map to the IP subnets associated with a known location for that IP device, the location server 534 marks the data base entry for that device as being in a roaming state and attempts to determine the new physical location by querying the device or the user of the device. In some embodiments, the location server 534 can enable multiple devices at different locations to share a single telephone number by using IP subnets to determine the location of the IP device 110. Also, location server 534 provides location updates that the E911 Service Bureau can enter in its location database 144.

Any physical address entered in the location server database is validated against a master directory of valid addresses such as a Master Street Address Guide (MSAG). If the physical address provided by an end-user or an end-user's proxy can not be validated against a master directory, the associated device can not receive E911 services. The physical address can be either a civil address including building identifier, street number street, city, state, zip code, or a geocoded location, such as latitude and longitude.

The E911 Emergency Service Bureau 140 is a service platform and may connect directly to the Data Center with connection 680 (see FIG. 6), or may connect to the Data Center indirectly using an external network such as Network 520. It should be understood that the functions of the Emergency Service Bureau could also be performed directly by the VoIP service provider, and could be located in the Data Center 530 or the service provider's network. In some embodiments, the location information is stored within the Data Center only. In some embodiments, the E911 Service Bureau can be replaced by another service platform, such as toll-free services or information services like "411." In some embodiments, the location server 534 may route the location information to a general routing function that provides many of the Advanced Intelligent Network (AIN) functions for routing determinations by, for example, an Integrated Service Control Point (ISCP).

Location database 536 is a database that stores pertinent data for the location server 534. For example, when a business signs up for an IP telephone service, the enterprise can provide the service provider with an inventory mapping of external IP addresses and internal IP subnets that are used at each physical address. The service provider assigns the customer certain telephone numbers to be used by IP device 110 or 171 at various locations. The location server 534 can create location information to be stored at the location database 536. The location information stored at the location database can include, among other things, the registration device identity, the telephone numbers, location status, physical address, external IP address, customer's internal IP subnets, and Direct Inward Dial (DID) numbers. If the VoIP protocol is SIP, the device identity may be the SIP User 10 that identifies the SIP endpoint. In some embodiments, the device identity could be the same as the telephone number, the telephone number with some additional characters appended, or some other unique identifier. The location status, for example, is used to indicate whether the telephone number is unregistered (U), at the physical home address (H) where the telephone number was first assigned by the service provider, or roaming (R) to a new site. The location database 536 may contain a field associated with each device indicating which physical address (if any) is presently registered with the Service Bureau for that device. The customer's internal IP subnets can be either private addresses, as defined by RFC 1918, or publicly routable IP addresses. In some embodiments where one or more external IP addresses are shared by multiple physical addresses, it is assumed that the private IP subnets can be mapped to well-defined physical addresses. The service provider may require the customer to impose a stable mapping of IP subnets to physical locations so that the emergency call network 100 can locate the user in an emergency situation.

Figure 6:
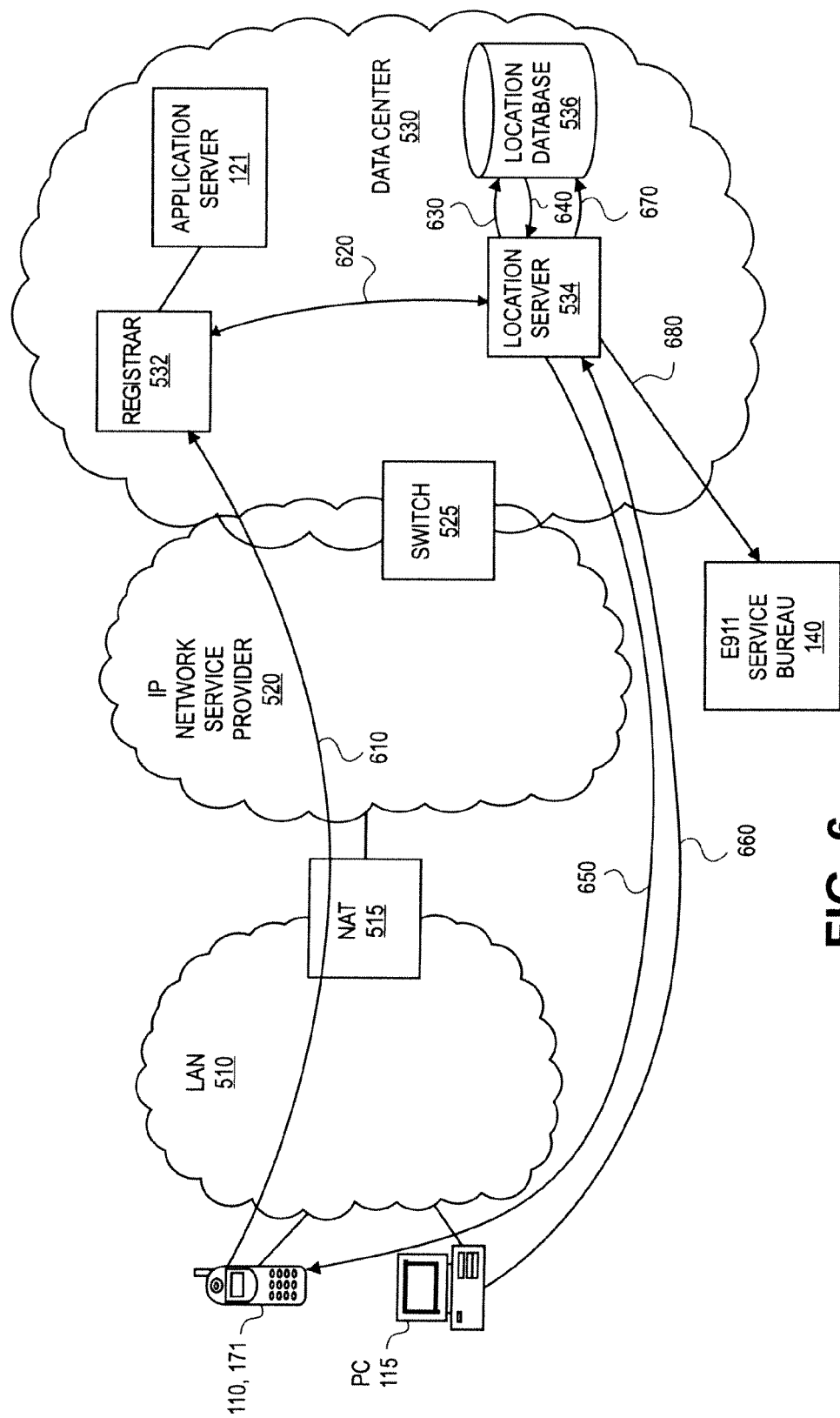
FIG. 6 is a functional diagram showing message flow in the exemplary system in FIG. 5 for providing registration and re-registration via a registrar.

FIG. 6 is a functional diagram showing message flow in the exemplary system in FIG. 5 for providing registration and re-registration via a registrar. In this exemplary embodiment, it is assumed that the IP device's IP address is not known at the location database and the external IP address does not match the internal IP address of the device. In addition, in this exemplary embodiment, it is assumed that the IP device 110 is connected to the LAN and has an assigned telephone number, an assigned device identity, and an assigned private address, for example, the telephone number 781-466-1234, device identity 7814661234.devicename and address 192.168.1.57 (which may be assigned by a Dynamic Host Configuration Protocol (DHCP) server for the LAN).

First, the IP device 110 or 171 attempts to register (610) by sending a REGISTER message, which includes a registration packet, using a VoIP protocol to the external registrar, such as external registrar located at address 4.3.2.1. For example, the VoIP protocol can be SIP. This registration request passes through the NAT. The NAT changes the source address of the packet to correspond to the external address of the site, such as an external address 6.7.8.9, and forwards the packet over network 520. The registrar 532 receives the registration packet and determines the telephone number and the private IP address from "Contact Header," "Via," or other fields in the registration message, and the external IP address is determined from the source address of the IP packet. For example, the contact header can be a SIP Contact Header "<sip: 7814661234.devicename@192.168.1.57:5060>" and the SIP message includes Via information "SIP/2.0/UDP 192.168.1.57:5060."

After the IP device 110 registers with the registrar 532, the registrar 532 transmits registration data to (620) the location server 534 and its database 536. Based on the received data from the registrar 532, the location server 534 uses the IP address information to determine if the device is at a known physical address. The device may be identified by a telephone number (TN), by a TN with an extension, such as TN.devicename, or by some other globally unique identifier available in the registration message.

The location server 534 then queries (630) the location database 536 for the stored IP address information or physical address information associated with the device. If the physical address information is provided, the location database may also indicate whether that physical address is presently registered with the E911 Service Bureau 140.

The location database 536 transmits (640) the stored data to the location server 534. The location server 534 compares the external IP address and the internal IP subnets found in the registration request with the IP address information associated with the device stored at the location database 536. If there is a match and the associated physical address is presently registered with the E911 Service Bureau 140, no further action is required. If that physical address is not registered with the Service Bureau 140 for that device, then the location server sends a message (680) to the Service Bureau to register that device at the physical address retrieved from the Location Database 536.

However, if there is not a match, as in this case, the location server 534 attempts to match the external IP address and the internal IP address to other entries in the location database. In this example, the IP addresses provided in the registration message fail to match the external and the internal IP address stored in the location database 536, and the location database 536 marks the location status as being "U" for unknown location for that device.

After the location database 536 stores the location status for the IP device 110 or 171, having identity "7814661234.devicename," as being located at an unknown location, the location server 534 has business rules that determine how to treat an unknown location for an IP device. In some embodiments, the location server 534 attempts to contact (650) the IP device or the user to determine the present physical address for the device. Contacting the user could include placing a call to the telephone number, sending a text message or page, sending an e-mail, sending an instant message (IM), or activating a dialogue window in the case of a soft client on an IP device. The message requests that the user provides location information to the location server 534. In response, the user provides (660) the location information to the location server 534 by inputting location information to a web browser located at the PC 115. In some embodiments, the user can input the location information at the IP device, via a web browser, a text message, or by a dialogue window opened by a soft client on that device. In some embodiments, the IP device itself may have means to determine its own location using a Global Positioning System or other means. In this case, the location server can query the device to determine its physical location as provided by a geocode or other means for location identification.

Once the location server 534 receives updated location data from the user or the IP device, it can validate that location data against a master directory such as the MSAG. The validated location data is stored (670) into the location database as the new physical address and the status field may be marked as "R" for roaming. On the other hand, if the user or IP device fails to provide the location data that can be validated, the location server 534 may take one or more business rules, which can include the following actions: repeating the request for location information, placing a phone call to the user at the telephone number and inform the user that the VoIP phone cannot be used for 911 calls, requesting an acknowledgement that the user is unable to provide address information, de-registering the phone by sending a de-registration request to the Registrar 532, or directing the user to use other means to make any E911 calls.

Once the validated location information is updated at the location database 536, the location server can then forward (680) the information to the E911 Service Bureau 140 for future reference in case the IP device calls E911. In some embodiments, the Service Bureau 140 can confirm that the transmitted information has been accepted and entered in its location database 144 as the physical location for that device. If a positive confirmation is received, the location server sends a message to the location database to mark that location as active with the Service Bureau. If a positive confirmation is not received by the location server, other business rules may be performed.

Figure 7:
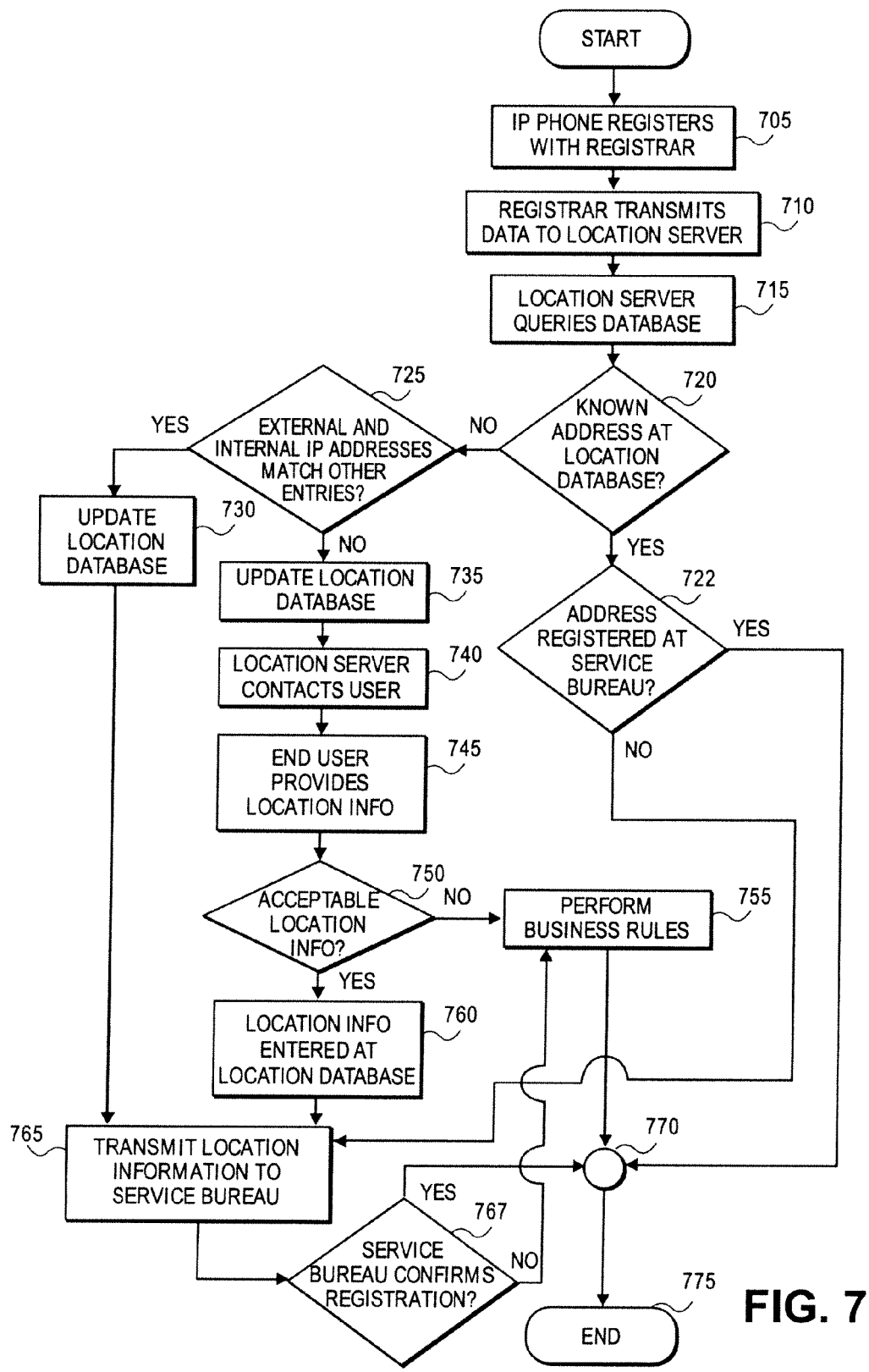
FIG. 7 is a flow chart representing an exemplary method for providing registration and re-registration via a registrar.

FIG. 7 is a flow chart representing an exemplary method for providing registration and re-registration via a registrar. In this exemplary embodiment, it is assumed that an IP device, for example IP device 110, is connected to the LAN and has an assigned telephone number, device identity, and a private IP address, for example "781-466-1234," "7814661234.devicename," and IP address "192.168.1.57" respectively.

First, the IP device registers (705) by sending a REGISTER message, which includes a registration packet, using a VoIP protocol to the external registrar, such as external registrar located at address 4.3.2.1. For example, the VoIP protocol can be SIP. This registration request passes through the NAT. The NAT changes the source address of the packet to correspond to the external address of the site, such as an external address 6.7.8.9, and forwards the request over the network. The registrar receives the registration packet and determines the device identity, the telephone number, and the private IP address from Contact Header, Via, or other fields in registration message, and the external IP address is determined from the source address of the IP packet. For example, the contact header can be a SIP Contact Header "<sip:7814661234.devicename@192.168.1.57:5060>" and the SIP message includes Via information "SIP/2.0/UDP 192.168.1.57:5060."

After the IP device registers with the registrar, the registrar transmits data (710) to the location server. Based on the received data, the location server determines if the IP device is at a known address by querying the location database (715) for the stored IP address information associated with the device. The location database returns the stored data to the location server. The location server compares (720) the external IP address and the internal IP subnets found in the registration request with the IP address information associated with the IP device stored at the location database. If there is a match, the location server determines from the stored data if the associated address is registered (722) for that device with the Service Bureau. If it is registered, the method proceeds to connector 770 and no further action is required (775).

If the associated address is not registered, then the location information is transmitted (765) to the Service Bureau. Service Bureau confirms (767) that the transmitted location information has been accepted and entered in its location database as the physical location for that device. If a positive confirmation is received, the location server sends a message to the location database to mark that location as active with the Service Bureau. If a positive confirmation is not received by the location server, other business rules are performed (755).

However, if the IP address and the internal IP subnets do not match IP address information associated with the IP device, the location server attempts to match (725) the external IP address and the internal IP address to other entries in the location database. If a new match is found, the location server may assume that the IP device is roaming and is not at the physical address associated with the external and internal IP addresses. The new address information (physical and IP) updates (730) the stored data for that particular device at the location database. For example, the location status of this particular device may be stored as "H" for home location or "R" for roaming location respectively. Consequently, the location server transmits (765) the location information to the Service Bureau.

In some embodiments, the Service Bureau confirms that the transmitted information has been accepted and entered in its location database as the physical location for that IP device. The location server marks this location as "active" for that device. If a positive confirmation is received, the location server sends a message to the location database to mark that location as active with the Service Bureau. If a positive confirmation is not received by the location server, other business rules may be performed (755).

If the external and internal IP address do not match other entries in the location database, the location server updates (735) the information stored at the location database. These other entries are mappings of external and internal IP addresses that are provided by an enterprise administrator or a network administrator responsible for assigning IP addresses to devices. For example, the location status of this particular device may be stored as "U" for unknown location.

When the location status for a particular device is unknown, the location server has business rules that determine how to treat an IP device at an unknown location. In some embodiments, the business rules could include the location server attempting to contact (740) the IP device or the user to determine the present physical address for the IP device. The location server can contact the user by several means, which can include placing a call to the telephone number, sending a text message or page, sending an e-mail, sending an instant message (IM), or activating a dialogue window in a soft client on the device. Consequently, the user provides (745) location information to the locations server by either entering the user's physical address at a website, sending a text message with the IP device's location, or responding to a dialogue window opened on the device or on the user's PC. It may be appreciated by one of ordinary skill that any messaging means can be used to request address information to the user and to transmit address information to the emergency call system 100. In some embodiments, the IP device itself may have means to determine its own location using a Global Positioning System or other means. In this case, the location server can query the device to determine its physical location as provided by a geocode or other means for location identification.

After the user or the device provides location information to the location server, the location server determines (750) whether the location information is acceptable or not by validating the address information against a standard address directory such as MSAG. If the location server does not receive acceptable location information, the location server may perform (755) one or more business rules. These business rules can include: repeating the request for location information, placing a phone call to the user at the telephone number and informing the user that the VoIP phone cannot be used for 911 calls, requesting an acknowledgement that the user is unable to provide address information, de-registering the phone, or informing the user to take other actions if there is a need to make an emergency call.

If the location server receives an acceptable address from the user, the accepted location information is entered (760) into the location database as the new physical address and the status field may be marked as "R" for roaming. Consequently, the location server transmits (765) the location information to the Service Bureau. The Service Bureau confirms that the transmitted information has been accepted and entered in its location database as the physical location for that device. If a positive confirmation is received, the location server sends a message to the location database to mark that location as active with the Service Bureau. If a positive confirmation is not received by the location server, other business rules can be performed 755.

Figure 8:
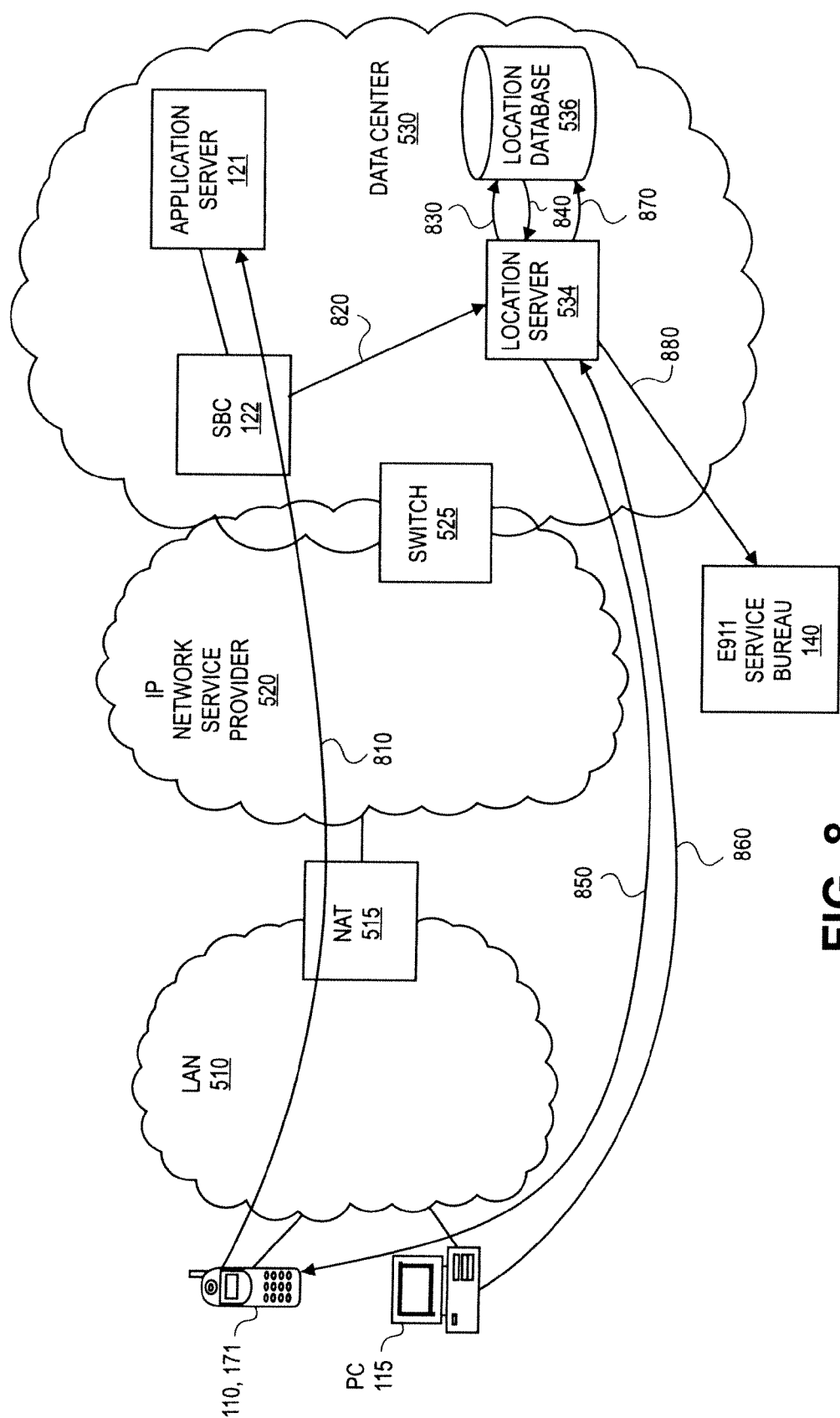
FIG. 8 is a functional diagram showing message flow in the exemplary system in FIG. 5 for providing registration information to the location server via an SBC.

FIG. 8 is a functional diagram showing message flow in the exemplary system in FIG. 5 for providing registration information to the location server via SBC 122. In this exemplary embodiment, it is assumed that the IP phone's IP address is not known at the location database and the external IP address does not match the internal IP address of the phone. In addition, in this exemplary embodiment, it is assumed that the IP device 110 is connected to the LAN and has an assigned telephone number, an assigned device identity, and an assigned private address, for example, the telephone number "781-466-1234," device identity "7814661234.devicename" and address "192.168.1.57" (for example, provided by the LAN DHCP server).

First, the IP device 110 or 171 attempts to register (810) by sending a REGISTER message, which includes a registration packet, using a VoIP protocol to the SBC 122, which has a public IP address 4.3.2.1. For example, the VoIP can be SIP. This registration request passes through a NAT. The NAT changes the source address of the packet to correspond to the external address of the site, such as an external address 6.7.8.9, and forwarded over network 520.

The registration packets, such as SIP signaling packets, are sent (810) to the application server 121, while being monitored by the SBC 122. The SBC identifies the registration packets and forwards (820) copies of the registration packets to the location server. The location server 534 opens the registration packet and determines the telephone number, the device identity, and the private IP address from Contact Header, Via, or other fields in registration message, and the external IP address is determined from the source address of the IP packet. For example, the contact header can be a SIP Contact Header "<sip:7814661234.devicename@192.168.1.57:5060>" and the SIP message includes Via information "SIP/2.0/UDP 192.168.1.57:5060."

After the location server 534 determines the device identity from the registration packets, the location server then queries (830) the location database 536 for the stored IP address information associated with the IP device. The location database 536 transmits (840) the stored data to the location server 534. The location server 534 compares the external IP address and the internal IP subnets found in the registration request with the IP address information associated with the IP device stored at the location database 536. If there is a match, the location server queries the location database to determine if the associated physical address is presently registered with the E911 Service Bureau 140. If that physical address is presently registered for that device with E911 Service Bureau 140, no further action is required. If that physical address is not registered with the E911 Service Bureau for that IP device, then the location server sends a message (880) to the Service Bureau to register that IP device at the physical address retrieved from the Location Database 536.

However, if there is not a match, as in this case, the location server 534 attempts to match the external IP address and the internal IP address to other entries stored in the location database 536. In this example, the IP addresses fail to match the IP subnet to the external IP address or the telephone to the external IP address and the location database 536 stores the location status for the telephone number as being "U" for unknown location.

After the location database 536 stores the location status for the IP device 110 or 171, having device identity "7814661234.devicename," as being located at an unknown location, the location server 534 has business rules that determine how to treat an unknown location for an IP device. In some embodiments, the location server 534 attempts to contact (850) the IP device or the user to determine the present physical address for the device. Contact to the user could be by several means, which could include placing a call to the telephone number, sending a text message or page, sending an e-mail, sending an instant message (IM), or activating a dialogue window on the device through a soft client. The message requests that the user provides location information to the locations server 534. In response, the user provides (860) the location information to the location server 534 by inputting location information to a web browser located at the PC 115. In some embodiments, the user can input the location information at the IP device, via a web browser or a text message, or through the dialogue window. In other cases, the device itself may have means to determine its own location using a Global Positioning System or other means. In this case, the location server can query the device to determine its physical location as provided by a geocode or other means for location identification.

Once the location server 534 receives updated location information from the user, it can validate the location data against a standard address directory, such as MSAG. Once the location information has been validated, the updated location date is stored (870) into the location database as the new physical address and the status field may be marked as "R" for roaming. On the other hand, if the user fails to provide the required information or the information provided can not be validated, the location server 534 may trigger business rules, such as performing one or more of the following actions: repeat the request for location information, place a phone call to the user at the telephone number and inform the user that the VoIP phone cannot be used for 911 calls, request an acknowledgement that the user is unable to provide address information, de-register the IP device, or inform the user to take alternative actions if there is a need to make an emergency call.

Once the location information is updated at the location database 536, the location server can then forward (880) the information to the E911 Service Bureau 140 for future reference in case the IP device calls the E911. In some embodiments, the E911 Service Bureau 140 confirms that the transmitted information has been accepted and entered in its location database 144 as the physical location for that device and subsequently, the location server 534 marks this location as active for that IP device. If a positive confirmation is received, the location server 534 sends a message to the location database 536 to mark that location as active with the Service Bureau. If a positive confirmation is not received by the location server 534, other business rules may be performed.

Figure 9:
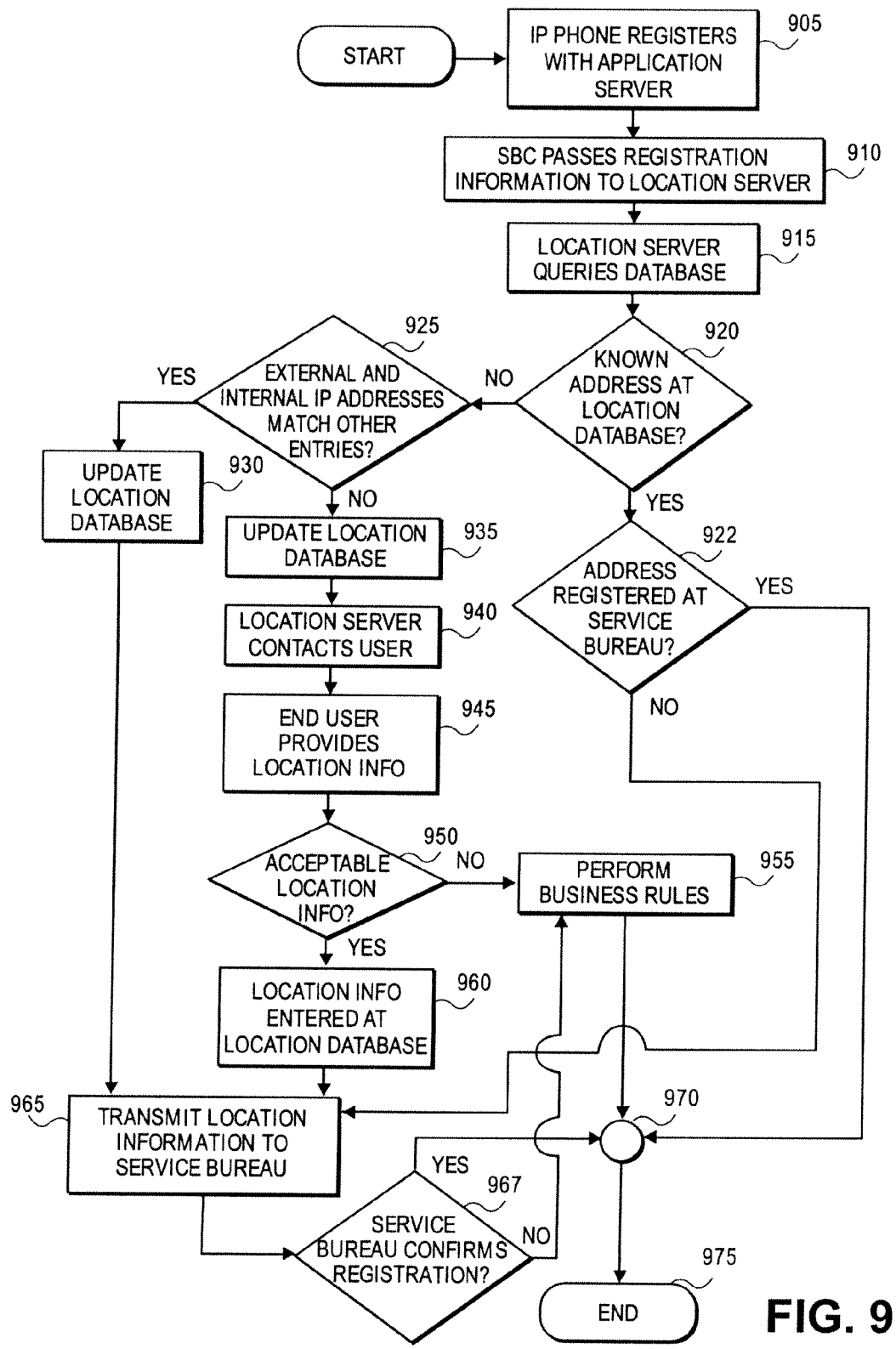
FIG. 9 is a flow chart representing an exemplary method for providing registration and re-registration via an SBC.

FIG. 9 is a flow chart representing an exemplary method for providing registration and re-registration via an SBC. In this exemplary embodiment, it is assumed that an IP device, for example IP device 110, is connected to the LAN and has an assigned telephone number, device identity, and a private IP address, for example "781-466-1234, " "7814661234.devicename," and IP address "192.168.1.57" respectively.

First, the IP device registers (905) by sending a REGISTER message, which includes a registration packet, using a VoIP protocol to the SBC, which has a public IP address 4.3.2.1. For example, the VoIP protocol can be SIP. This registration request passes through the NAT. The NAT changes the source address of the packet to correspond to the external address of the site, such as an external address 6.7.8.9, and forwards over the network.

The registration packets, such as SIP signaling packets, are sent to the application server, while being monitored by the SBC. The SBC identifies the registration packets and passes (910) copies of the registration packets to the location server. The location server receives the registration packets and determines the telephone number, device identity, and the private IP address from Contact Header, Via, or other fields in registration message, and the external IP address is determined from the source address of the IP packet. For example, the contact header can be a SIP Contact Header "<sip: 7814661234.devicename@192.168.1.57:5060>" and the SIP message includes Via information "SIP/2.0/UDP 192.168.1.57:5060."

After the location server determines the device identity from the registration packets, the location server then queries (915) the location database for the stored IP address information associated with IP device. The location database returns the stored data to the location server. The location server compares (920) the external IP address and the internal IP subnets found in the registration request with the IP address information associated with the device stored at the location database. If there is a match, the location server determines from the stored data if the associated address is registered (922) for that device with the Service Bureau. If it is registered, the method proceeds to connector 970 and no further action is required (975).

If the associated address is not registered, then the location information is transmitted (965) to the Service Bureau. Service Bureau (967) confirms that the transmitted location information has been accepted and entered in its location database as the physical location for that device. If a positive confirmation is received, the location server sends a message to the location database to mark that location as active with the Service Bureau. If a positive confirmation is not received by the location server, other business rules are performed (955).

However, if the IP address and the internal IP subnets do not match IP address information associated with the IP device, the location server attempts to match (925) the external IP address and the internal IP address to other entries in the location database. If a new match is found, the location server assumes that the IP device is roaming and is not at the physical address previously associated with the IP device. The new address information (physical and IP) updates (930) the stored data for that particular IP device at the location database. For example, the location status of this particular IP device may be stored as "H" for home location or "R" for roaming location respectively. Consequently, the location server transmits (965) the location information to the Service Bureau.

In some embodiments, the Service Bureau confirms that the transmitted information has been accepted and entered in its location database as the physical location for that IP device. The location server marks this location as "active" for that device. If a positive confirmation is received, the location server sends a message to the location database to mark that location as active with the Service Bureau. If a positive confirmation is not received by the location server, other business rules may be performed (955).

If the external and internal IP address do not match other entries in the location database, the location server updates (935) the information stored at the location database. These other entries are mappings of external and internal IP addresses that are provided by an enterprise administrator or a network administrator responsible for assigning IP addresses to devices. For example, the location status of this particular device may be stored as "U" for unknown location.

When the location status for a particular device is unknown, the location server has business rules that determine how to treat an IP device at an unknown location. In some embodiments, the business rules could include the location server attempting to contact (940) the IP device or the user to determine the present physical address for the IP device. The location server can contact the user by several means, which includes placing a call to the telephone number, sending a text message or page, sending an e-mail, or sending an instant message (IM). Consequently, the user provides (945) location information to the locations server by either entering the user's physical address at a website or sending a text message with the IP device's location. It may be appreciated by one of ordinary skill that any messaging means can be used to request address information to the user and to transmit address information to the emergency call system. In some embodiments, the IP device may have means to determine its own location using a Global Positioning System or other means. In this case, the location server can query the device to determine its physical location as provided by a geocode or other means for location identification.

After the user provides location information to the location server, the location server determines (950) whether the location information can be validated against an MSAG. If the location server does not receive acceptable location information, the location server may perform (955) one or more business rules. These business rules can include: repeating the request for location information, placing a phone call to the user at the telephone number and informing the user that the VoIP phone cannot be used for 911 calls, requesting an acknowledgement that the user is unable to provide address information, de-registering the device, or instructing the user to take other actions if there is a need to place a 911 call.

If the location server receives an address from the user that can be validated, the location information is entered (960) into the location database as the new physical address and the status field may be marked as "R" for roaming. Consequently, the location server transmits (965) the location information to the Service Bureau. In some embodiments, the Service Bureau confirms that the transmitted information has been accepted and entered in its location database as the physical location for that device. The location server marks this location as active for that IP device. If a positive confirmation is received, the location server sends a message to the location database to mark that location as active with the Service Bureau. If a positive confirmation is not received by the location server, other business rules may be performed (955).

Figure 10:
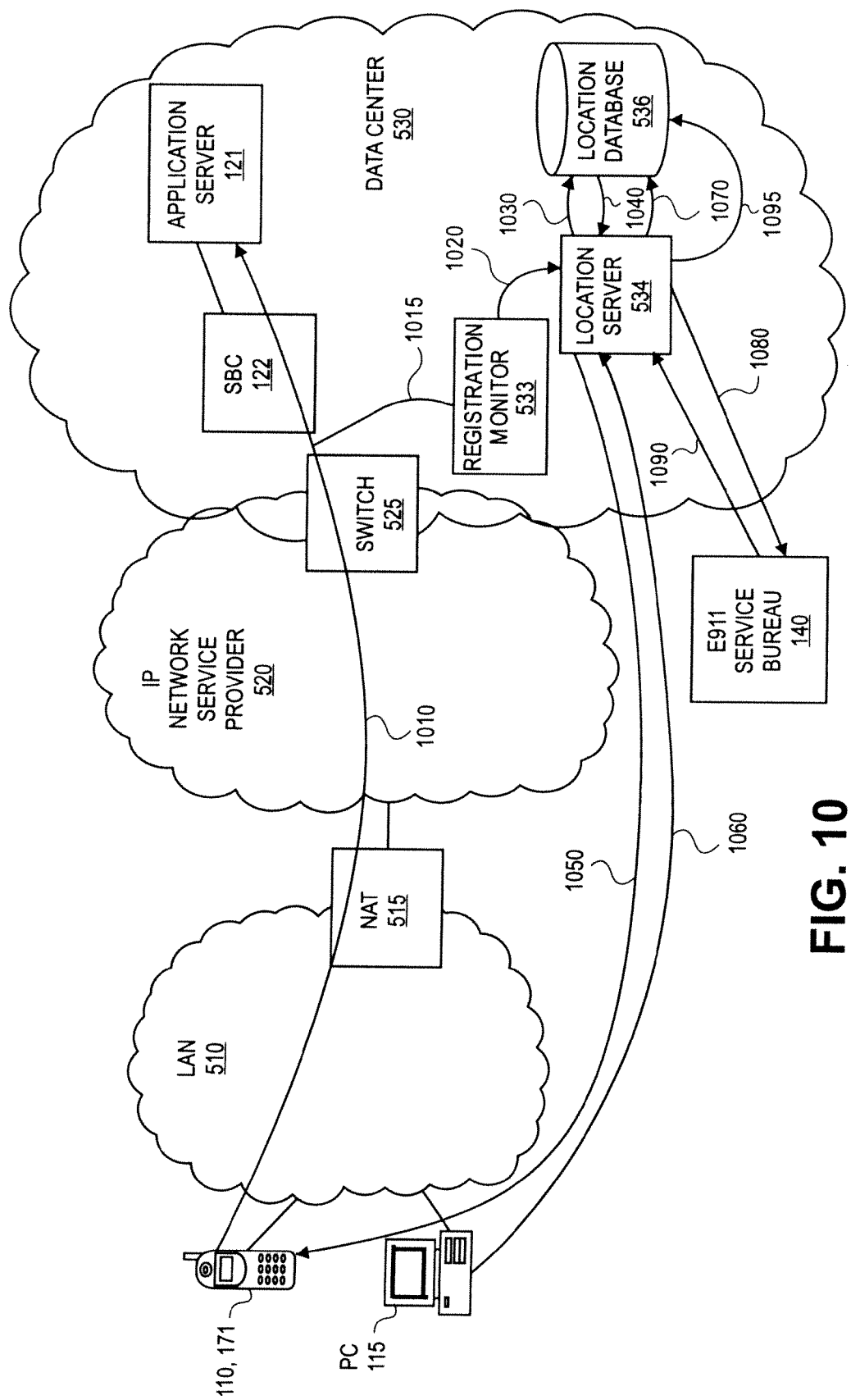
FIG. 10 is a functional diagram showing message flow in the exemplary system in FIG. 5 for providing registration information to the location server via a switch.

FIG. 10 is a functional diagram showing message flow in the exemplary system in FIG. 5 for providing registration information to the location server via registration monitor 533. In some embodiments, the user has more than one IP device that shares the same telephone number, where each IP device is activated at the application server and assigned a unique device identity. The registration name could be a telephone number with an extension, for example "7814661234.devicename," or another globally unique identifier, such as "bob.jones.laptop@acmeservices.com." Once activated, the location server 534 creates a new entry at location database 536 for each IP device sharing a same telephone number.

In this exemplary embodiment, it is assumed that the IP device's IP address is not known at the location database and the external IP address does not match the internal IP address of the device. In addition, in this exemplary embodiment, it is assumed that the IP device 110 is connected to the LAN and has an assigned telephone number, an assigned device identity, and an assigned private address, for example number "781-466-1234," device identity "7814661234.devicename," and IP address "192.168.1.57" (for example, provided by the LAN DHCP server).

First, the IP device 110 or 171 registers (1010) with the application server 121. The IP device 110 sends a REGISTER message, which includes a registration packet, using a VoIP protocol to the SBC 122, which has a public IP address 4.3.2.1. For example, the VoIP protocol can be SIP. Prior to the SBC receiving the registration packets, the registration request passes through the NAT. The NAT changes the source address of the packet to correspond to the external address of the site, such as an external address 6.7.8.9, and forwards over network 520.

The registration packets, such as SIP signaling packets, are then sent (1010) to the application server 121, while being monitored by the registration monitor 533. The registration monitor 533 identifies the registration packets and either forwards (1020) copies of the registration packets to the location server 534, or extracts the IP address information and device identity information and transmits that to the location server 534. Alternatively, the registration monitor 533 can locally cache IP address information associated with each device, and transmit updated information to the location server if the IP addresses change. It may be readily appreciated by one of ordinary skill, that SBC 122 or the application server 121 also has the ability to provide the registration packets or registration information to the location server. The location server 534 opens the registration packet and determines the device identity, the telephone number, and the private IP address from Contact Header, Via, or other fields in registration message, and the external IP address is determined from the source address of the IP packet. For example, the contact header can be a SIP Contact Header "<sip: 7814661234.devicename@192.168.1.57:5060>" and the SIP message includes Via information "SIP/2.0/UDP 192.168.1.57:5060."

After the location server 534 determines the device identity from information provided by the registration monitor 533, the location server then queries (1030) the location database 536 for the stored IP address information associated with the IP device. The location database 536 transmits (1040) the stored data to the location server 534. The location server 534 compares the external IP address and the internal IP subnets found in the registration information transmitted by the registration monitor 533 with the IP address information associated with the IP device stored at the location database 536. If there is a match, the location server queries the location database to determine if the associated physical address is presently registered with the E911 Service Bureau 140. If that physical address is presently registered for that device with E911 Service Bureau 140, no further action is required. If that physical address is not registered with the E911 Service Bureau 140 for that device, then the location server 534 can send a message (1080) to the Service Bureau to register that device at the physical address retrieved from the Location Database 536.

However, if there is not a match, as in this case, the location server 534 attempts to match the external IP address and the internal IP address to other entries in the location database. In this example, the external and internal IP addresses provided by the registration monitor 533 fail to match the external IP address or the telephone to the external IP address and the location database 536 stores the location status for the telephone number as being "U" for unknown location.

After the location database 536 stores the location status for the IP device 110 or 171, having device identity "7814661234.devicename," as being located at an unknown location, the location server 534 has business rules that determine how to treat an unknown location for an IP device. In some embodiments, the location server 534 attempts to contact (1050) the IP device or the user to determine the present physical address for the phone. Contact to the user could be by several means, which could include placing a call to the telephone number, sending a text message or page, sending an e-mail, sending an instant message (IM), or activating a dialogue window using a device application. The message requests that the user provides location information to the locations server 534. In response, the user provides (1060) the location information to the location server 534 by inputting location information to a web browser located at the PC 115. In some embodiments, the user can input the location information at the IP device, via a web browser or a text message, or a dialogue window. In some embodiments, the device itself may have means to determine its own location using a Global Positioning System or other means. In this case, the location server can query the device to determine its physical location as provided by a geocode or other means for location identification.

Once the location server 534 receives updated location information, from the user, that is validated against location data stored in the MSAG, the validated location date is stored (1070) into the location database as the new physical address and the status field may be marked as "R" for roaming. On the other hand, if the user fails to provide the required information, the location server 534 may trigger business rules, such as performing one or more of the following actions: repeat the request for location information, place a phone call to the user at the telephone number and inform the user that the VoIP phone cannot be used for 911 calls, request an acknowledgement that the user is unable to provide address information, de-register the device, or inform the user to use alternative means to make a 911 call.

Once the location information is updated at the location database 536, the location server can then forward (1080) the information to the E911 Service Bureau 140 for future reference in case the IP device calls the E911. In some embodiments, the Service Bureau 140 confirms (1090) that the transmitted information has been accepted and entered in its location database (1095) as the physical location for that device. If a positive confirmation is received, the location server sends a message to the location database to mark that location as active with the Service Bureau. If a positive confirmation is not received by the location server, other business rules may be performed.

Figure 11:
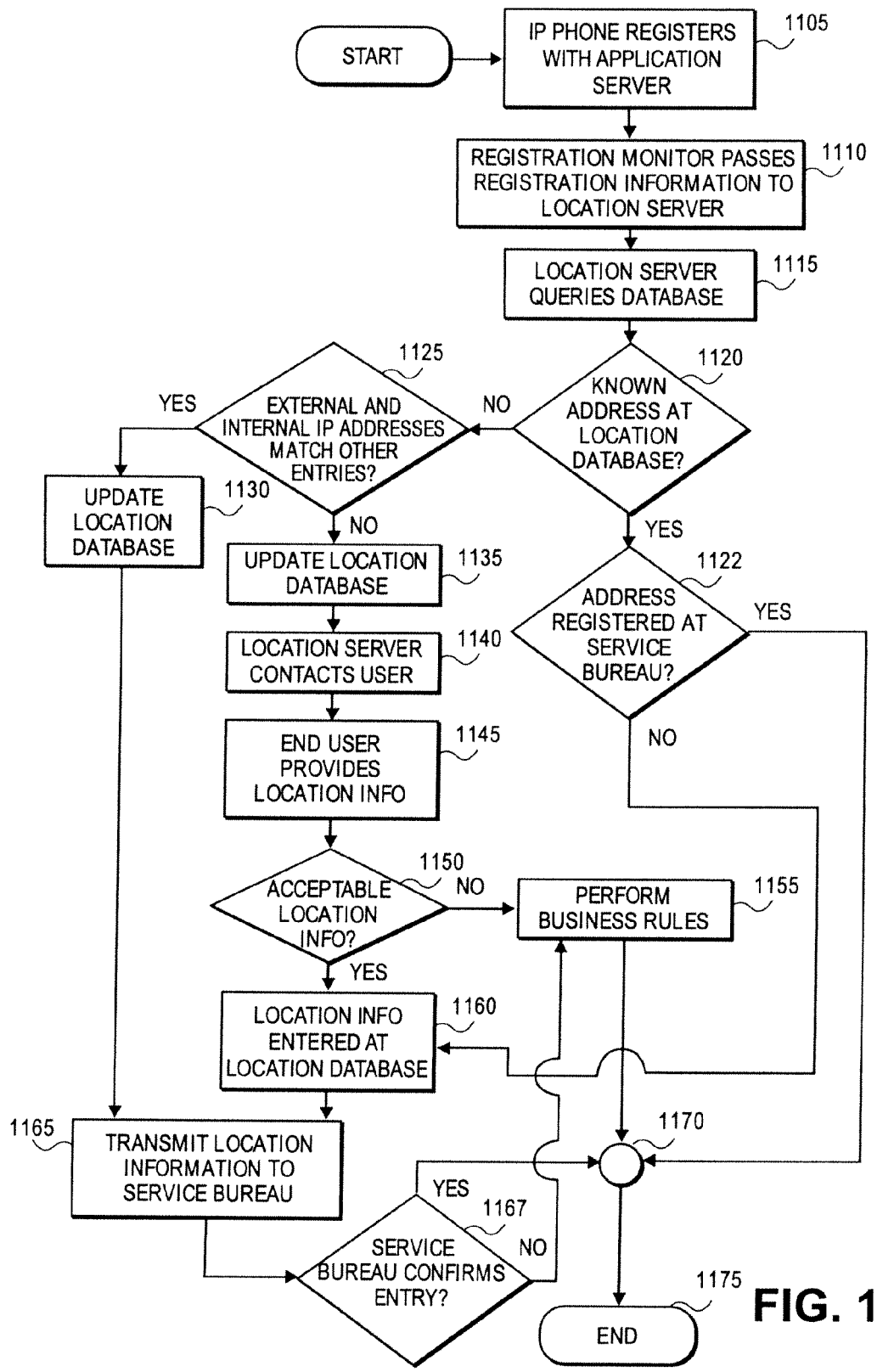
FIG. 11 is a flow chart representing an exemplary method for providing registration information to the location server via a switch.

FIG. 11 is a flow chart representing an exemplary method for providing registration information to the location server via registration monitor. In this exemplary embodiment, it is assumed that an IP device, for example IP device 110, is connected to the LAN and has an assigned telephone number, a device identity, and a private IP address, for example "781-466-1234," "7814661234.devicename," and IP address "192.168.1.57" respectively.

First, the IP device registers (1105) registers with the application server. The IP device sends a REGISTER message, which includes a registration packet, using a VoIP protocol to the SBC, which has a public IP address 4.3.2.1. For example, the VoIP protocol can be SIP. This registration request passes through the NAT. The NAT changes the source address of the packet to correspond to the external address of the site, such as an external address 6.7.8.9, and forwards over the network.

The registration packets, such as SIP signaling packets, are sent to the application server, while being monitored by the registration monitor. The registration monitor identifies the registration packets and either passes copies of the registration packets or extracts registration information which it transmits (1110) to the location server. The location server receives the registration packets and determines the telephone number, device identity, and the private IP address from Contact Header, Via, or other fields in registration message, and the external IP address is determined from the source address of the IP packet. For example, the contact header can be a SIP Contact Header "<sip:7814661234.devicename@ 192.168.1.57:5060>" and the SIP message includes Via information "SIP/2.0/UDP 192.168.1.57:5060."

After the location server determines the device identity from the information it receives, the location server then queries (1115) the location database 536 for the stored IP address information associated with the device identity. The location database returns the stored data to the location server. The location server compares (1120) the external IP address and the internal IP subnets found in the registration information with the IP address information associated with the device stored at the location database. If there is a match, the location server determines from the stored data if the associated address is registered (1122) for that device with the Service Bureau. If it is registered, the method proceeds to connector 1170 and no further action is required (1175).

If the associated address is not registered, then the location information is transmitted (1165) to the Service Bureau. Service Bureau confirms (1167) that the transmitted location information has been accepted and entered in its location database as the physical location for that device. If a positive confirmation is received, the location server sends a message to the location database to mark that location as active with the Service Bureau. If a positive confirmation is not received by the location server, other business rules are performed (1155).

However, if there is not a match, the location server attempts to match (1125) the external IP address and the internal IP address to other entries in the location database. If a new match is found, the location server may assume that the IP device is roaming and is not at the physical address previously associated with device. The new address information (physical and IP) updates (1130) the stored data for that particular device at the location database. For example, the location status of this particular device may be stored as "H" for home location or "R" for roaming location respectively. Consequently, the location server transmits (1165) the location information to the Service Bureau.

If the associated address is not registered, then the location information is transmitted to the Service Bureau (1160). The Service Bureau confirms that the transmitted location information has been accepted and entered in its location database as the physical location for that device. If a positive confirmation is received, the location server sends a message to the location database to mark that location as active with the Service Bureau. If a positive confirmation is not received by the location server, other business rules are performed (1155).

If the external and internal IP address do not match other entries, the location server updates (1135) the information stored at the location database. These other entries are mappings of external and internal IP addresses that are provided by an enterprise administrator or a network administrator responsible for assigning IP addresses to devices. For example, the location status of this particular device may be stored as "U" for unknown location.

When the location status for a particular device is unknown, the location server has business rules that determine how to treat an IP device at an unknown location. In some embodiments, the business rules could include the location server attempting to contact (1140) the IP device or the user to determine the present physical address for the IP device. The location server can contact the user by several means, which includes placing a call to the telephone number, sending a text message or page, sending an e-mail, sending an instant message (IM), or activating a dialogue window on the device. Consequently, the user provides (1145) location information to the locations server by either entering the user's physical address at a website or sending a text message with the IP device's location. It may be appreciated by one of ordinary skill that any messaging means can be used to request address information to the user and to transmit address information to the emergency call system. In some embodiments, the device itself may have means to determine its own location using a Global Positioning System or other means. In this case, the location server can query the device to determine its physical location as provided by a geocode or other means for location identification.

After the user provides location information to the location server, the location server determines (1150) whether the location information is acceptable or not by validating it against a standard address directory. If the location server does not receive acceptable location information, the location server may perform (1155) one or more business rules. These business rules can include: repeating the request for location information, placing a phone call to the user at the telephone number and informing the user that the VoIP phone cannot be used for 911 calls, requesting an acknowledgement that the user is unable to provide address information, de-registering the phone, or informing the user to use alternative means to make a 911 call.

If the location server receives an acceptable address from the user, the accepted location information is entered (1160) into the location database as the new physical address and the status field may be marked as "R" for roaming. Consequently, the location server transmits (1165) the location information to the Service Bureau. The Service Bureau confirms (1167) that the transmitted information has been accepted and entered in its location database as the physical location for that device. If a positive confirmation is received, the location server sends a message to the location database to mark that location as active with the Service Bureau. If a positive confirmation is not received by the location server, other business rules 1155 may be performed.

The methods disclosed herein may be implemented as a computer program product, i.e., a computer program tangibly embodied in an information carrier, e.g., in a machine/processor readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments may be apparent to those skilled in the art from consideration of the specification and practice of the preferred embodiments disclosed herein. It is intended that the specification and examples described herein be considered as exemplary only, with a true scope and spirit of the invention being indicated by the following claims.

What is claimed is:

1. A system comprising:
    a location server configured to monitor a register message associated with an Internet Protocol (IP) device, wherein the register message includes an internal IP address and an external IP address; and
    a location database configured to store physical location information and a stored plurality of IP addresses associated with the IP device, wherein the location server determines whether at least one of the internal IP address and the external IP address of a selected message corresponds with any of the stored plurality of IP addresses associated with the IP device; acquires physical location information corresponding to at least one of the internal IP address and the external IP address if at least one of the internal IP address and the external IP address do not correspond with any of the stored plurality of IP addresses associated with the IP device; and provides the physical location information for use in locating the IP device.

2. The system of claim 1, wherein the stored plurality of IP addresses include a stored internal IP address and a stored external IP address from a previous register message.

3. The system of claim 1, wherein the location database is configured to store an association between physical location information and at least a portion of an IP address.

4. The system of claim 3, wherein the acquired physical location information corresponds to physical location information associated with at least a portion of the stored IP address that matches at least one of the internal IP address and at least a portion of the external IP address.

5. The system of claim 1, wherein the internal IP address is a public IP address and the external IP address is a private IP address.

6. The system of claim 5, wherein the private IP address is provided by a Session Initiation Protocol header within the register message.

7. The system of claim 5, wherein the private IP address is provided by a via header within the register message.

8. The system of claim 1, wherein the location server can provide the physical location information to a service bureau.

9. The system of claim 1, wherein the physical location information includes an emergency number identifier.

10. The system of claim 1, wherein the stored plurality of IP addresses associated with the IP device are compared with both the internal IP address and the external IP address.

11. The system of claim 1, wherein the location server determines whether at least one of the internal IP address and the external IP address of a selected message corresponds with any of the stored plurality of IP addresses includes the location server determines whether both the internal IP address and the external IP address of the selected message correspond with the stored plurality of IP addresses of the IP device.

12. The system of claim 11, wherein the location server acquires the physical location information corresponding to at least one of the internal IP address and the external IP address if both of the internal IP address and the external IP address do not correspond with any of the stored plurality of IP addresses associated with the IP device.

13. A method comprising:
    monitoring messages from an Internet Protocol (IP) device, wherein at least some of the messages provide an internal IP address and an external IP address;
    determining whether at least one of the internal IP address and the external IP address of a selected message corresponds with any of a stored plurality of IP addresses associated with the IP device;
    acquiring physical location information corresponding to at least one of the internal IP address and the external IP address if at least one of the internal IP address and the external IP address do not correspond with any of the stored plurality of IP addresses associated with the IP device, wherein the acquired physical location information is used to assist with locating the IP device.

14. The method of claim 13, wherein the acquired physical location information corresponds to physical location information associated with at least a portion of a stored IP address that matches at least one of the internal IP address and at least a portion of the external IP address.

15. The method of claim 13, wherein the internal IP address is a public IP address and the external IP address is a private IP address.

16. The method of claim 15, wherein the private IP address is located in a Session Initiation Protocol header within the selected message.

17. The method of claim 15, wherein the private IP address is located in a via header within the selected message.

18. The method of claim 13, wherein the physical location information includes an emergency number identifier.

19. A non-transitory computer readable medium storing instructions that, when executed by a computer, cause the computer to perform the method of claim 13.

20. The non-transitory computer readable medium of claim 19, further comprising comparing the stored plurality of IP addresses associated with the IP device with both the internal IP address and the external IP address.

21. The non-transitory computer readable medium of claim 19, wherein the determining includes determining whether both the internal IP address and the external IP address of the selected message correspond with the stored plurality of IP addresses of the IP device.

22. The non-transitory computer readable medium of claim 21, wherein acquiring physical location information includes acquiring physical location information associated with both the internal IP address and the external IP address that does not correspond with any of the stored plurality of IP addresses associated with the IP device.

23. The method of claim 13, further comprising comparing the stored plurality of IP addresses associated with the IP device with both the internal IP address and the external IP address.

24. The method of claim 13, wherein the determining includes determining whether both the internal IP address and the external IP address of the selected message correspond with the stored plurality of IP addresses of the IP device.

25. The method of claim 24, wherein acquiring physical location information includes acquiring physical location information associated with both the internal IP address and the external IP address that does not correspond with any of the stored plurality of IP addresses associated with the IP device.

26. A method comprising:
providing a plurality of Internet Protocol (IP) addresses that have a stored association with an IP device;
receiving a query for physical location information, wherein the query is a result of at least one of an internal IP address and an external IP address, both of which are provided by a register message originating from the IP device, not corresponding with any of the plurality of IP addresses that have the stored association with the IP device and wherein at least one of the internal IP address and the external IP address is associated with a current physical location information of the IP device; and
storing an association between the current physical location information and the IP device.

27. The method of claim 26, further comprising providing the current physical location for assisting with locating the IP device.

28. The method of claim 26, further comprising matching at least one of the internal IP address and a portion of the external IP address with at least a portion of an IP address stored within a database entry.

29. The method of claim 28, wherein the database entry includes physical location information associated with the stored IP address.

30. The method of claim 29, wherein the physical location information associated with the stored IP address is, based on the match, the current physical location information of the IP device.

31. A non-transitory computer readable medium storing instructions that, when executed by a computer, cause the computer to perform the method of claim 26.

32. The non-transitory computer readable medium of claim 31, wherein the query is a result of both the internal IP address and the external IP address not corresponding with any of the plurality of IP addresses that have the stored association with the IP device.

33. The non-transitory computer readable medium of claim 31, wherein both the internal IP address and the external IP address are associated with the current physical location.

34. The method of claim 26, wherein the query is a result of both the internal IP address and the external IP address not corresponding with any of the plurality of IP addresses that have the stored association with the IP device.

35. The method of claim 26, wherein both the internal IP address and the external IP address are associated with the current physical location.

* * * * *